United States Patent
Simpson

(10) Patent No.: US 6,804,650 B2
(45) Date of Patent: Oct. 12, 2004

(54) APPARATUS AND METHOD FOR PHONETICALLY SCREENING PREDETERMINED CHARACTER STRINGS

(75) Inventor: Anita Hogans Simpson, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 681 days.

(21) Appl. No.: 09/742,779

(22) Filed: Dec. 20, 2000

(65) Prior Publication Data

US 2002/0077820 A1 Jun. 20, 2002

(51) Int. Cl.[7] .............................................. G10L 13/08
(52) U.S. Cl. ..................................................... 704/260
(58) Field of Search ................................ 704/260, 269; 379/221.01, 221.06, 221.09, 221.1, 221.12, 235

(56) References Cited

U.S. PATENT DOCUMENTS

| | | | |
|---|---|---|---|
| 5,438,568 A | | 8/1995 | Weisser, Jr. |
| 5,799,267 A | * | 8/1998 | Siegel ............................ 704/1 |
| 5,835,892 A | * | 11/1998 | Kanno ......................... 704/257 |
| 5,940,797 A | * | 8/1999 | Abe ............................. 704/260 |
| 5,953,692 A | * | 9/1999 | Siegel ............................ 704/1 |
| 6,029,132 A | * | 2/2000 | Kuhn et al. .................. 704/260 |
| 6,438,520 B1 | * | 8/2002 | Curt et al. ................... 704/254 |
| 6,442,523 B1 | * | 8/2002 | Siegel ......................... 704/270 |

* cited by examiner

*Primary Examiner*—Doris H. To
*Assistant Examiner*—Michael N. Opsasnick
(74) *Attorney, Agent, or Firm*—Kirkpatrick & Lockhart LLP

(57) ABSTRACT

An apparatus for phonetically screening predetermined character strings. The apparatus includes a text-to-speech module, and a phonetic screening module in communication with the text-to-speech module. The phonetic screening module is for replacing a first character string with a second character string based on a phonetic enunciation by the text-to-speech module of the first character string.

23 Claims, 8 Drawing Sheets ered character strings according to one
APPARATUS AND METHOD FOR PHONETICALLY SCREENING PREDETERMINED CHARACTER STRINGS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention relates generally to text-to-speech applications and, more particularly, to apparatuses and methods for phonetically screening predetermined character strings.

2. Description of the Background

Some advanced telecommunications services provide for the audible enunciation to the called party of the name of the calling party. For example, according to a talking call waiting (TCW) service, if the called party receives an incoming call when it is already participating in another call, the called party may press a key on the keypad of the telephone to receive an audible enunciation of the subscriber name associated with the calling party. In addition, according to an audio calling name (ACN) service, the called party is provided an audible enunciation of the subscriber name associated with the calling party for an incoming call. The called party may then be played a message prompting the called party to, for example, either accept the incoming call, reject the call, or forward it to a voice messaging system.

With either of these exemplary telecommunications services, or any other similar service, because of data storage limitations, the subscriber name of the calling party is typically truncated to approximately fifteen characters, although the billing name associated with the calling party may be as great as fifty characters or more. Consequently, in some instances the truncated form of the calling party's name may be unacceptable in, for example, an etiquette sense, for phonetic enunciation to the called party.

Accordingly, there exists a need for a manner in which certain predetermined character strings, which are unacceptable for phonetic enunciation, may be replaced with more appropriate character strings.

SUMMARY OF THE INVENTION

The present invention is directed to an apparatus for phonetically screening predetermined character strings. According to one embodiment, the apparatus includes a text-to-speech module, and a phonetic screening module in communication with the text-to-speech module. The phonetic 'screening module is for replacing a first character string with a second character string based on a phonetic enunciation by the text-to-speech module of the first character string.

The apparatus of the present invention may be used, for example, to screen predetermined character strings which are phonetically inappropriate to be voiced to an intended listener. For example, the present invention may be used in the provision of telecommunications services in which the name of, for example, a present or prior calling party, is voiced to a listener. Such telecommunications services include, for example, talking call waiting (TCW), audio calling name (ACN), and audio call return (ACR). Because the name of the calling party stored in a network database of a telephone network is typically a truncated form of the calling party's true name due to data storage limitations, the present invention may be employed to prevent the enunciation to the listener of truncated names that are inappropriate. For example, the apparatus of the present invention may be used to phonetically screen expletives or other unflattering words.

In addition to telecommunications services, benefits of the present invention may also be realized in other applications in which text content is to be voiced to a listener. Such other applications include, for example, the conversion of electronic mail or word processing text documents to speech for delivery to a listener over a network such as, for example, the Internet or a telephone network.

These and other benefits of the present invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements. For example, certain operating system details and modules of certain of the intelligent platforms are not described herein. Those of ordinary skill in the art will recognize, however, that these and other elements may be desirable in a typical communications network. However, because such elements are well known in the art, and because they do not facilitate a better understanding of the present invention, a discussion of such elements is not provided herein.

Figure 1:
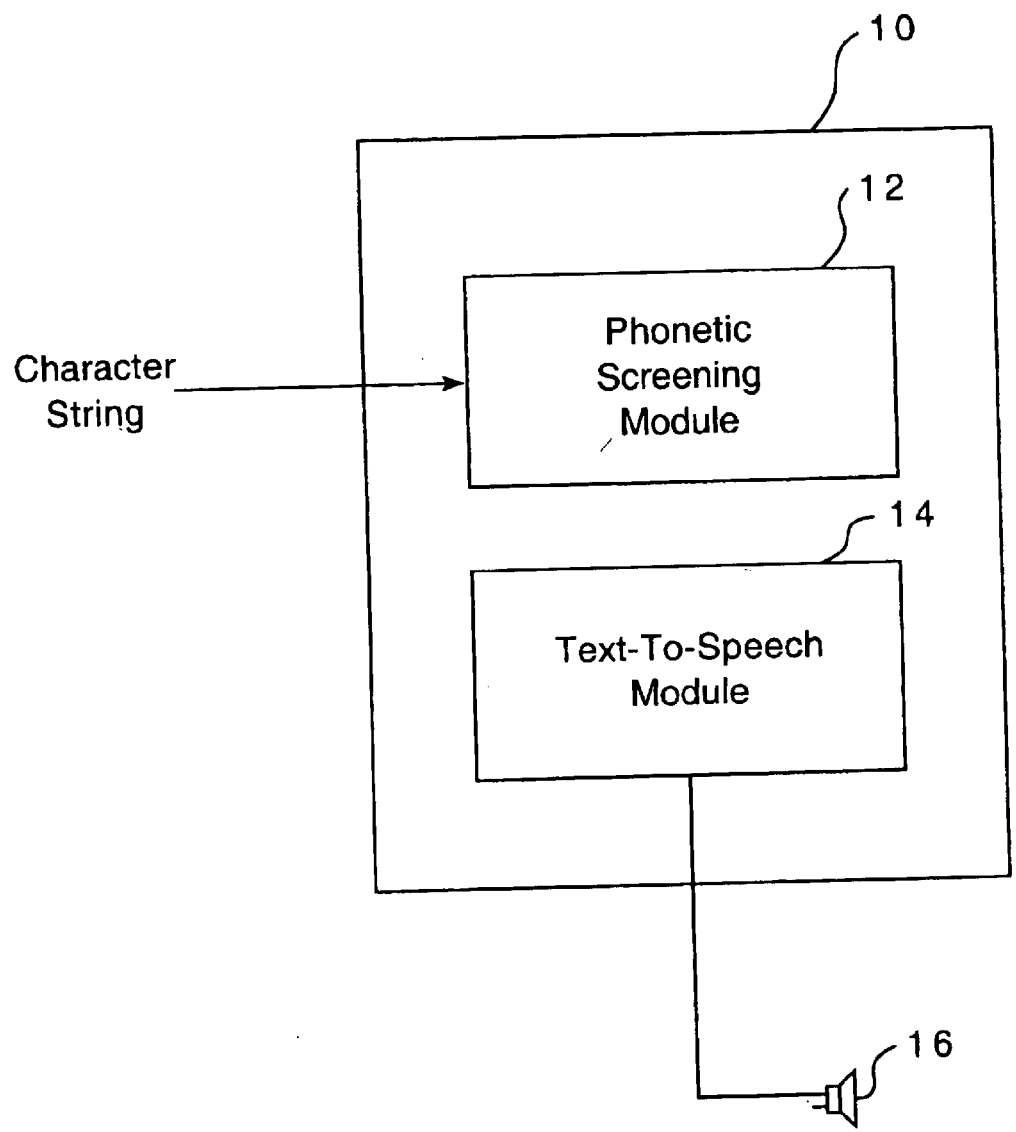
FIG. 1 is a block diagram of an apparatus for phonetically screening predetermined character strings according to one embodiment of the present invention.

FIG. 1 is a block diagram of an apparatus 10 according to one embodiment of the present invention for phonetically screening predetermined character strings that are to be audibly enunciated. The apparatus 10 includes a phonetic screening module 12 and a text-to-speech (TTS) module 14. The apparatus 10, as discussed further hereinbelow, receives a character string and outputs a corresponding audible enunciation of the character string via a speaker device 16 in communication with the apparatus 10. The phonetic screening module 12, as described further hereinbelow, may replace certain of the received character strings with substitute character strings based on phonetic screening of the received character strings.

The apparatus 10 may be implemented on an intelligent platform such as, for example, a computer, such as a workstation or a personal computer, a microprocessor, a network server, or an application specific integrated circuit (ASIC). According to another embodiment as described further hereinbelow, the apparatus 10 may be implemented on an intelligent peripheral (IP) device of an intelligent telecommunications network, such as a service node of an Advanced Intelligent Network (AIN).

The modules 12, 14 may be implemented as software code to be executed by the apparatus 10 using any type of computer instruction type suitable such as, for example, microcode, and may be stored in, for example, an electrically erasable programmable read only memory (EEPROM), or can be configured into the logic of the apparatus 10. According to another embodiment, the modules 12, 14 may be implemented as software code to be executed by the system 10 using any suitable computer language such as, for example, Java, C or C++ using, for example, conventional or object-oriented techniques. The software code may be stored as a series of instructions or commands on a computer readable medium, such as a random access memory.(RAM), a read only memory (ROM), a magnetic medium such as a hard-drive or a floppy disk, or an optical medium such as a CD-ROM. According to one embodiment, the modules 12, 14 may reside on separate physical devices.

The speaker device 16 may be implemented as, for example, a transducer that converts electrical energy, such as an electrical signal from the TTS module 14, into mechanical energy at audio frequencies. According to one embodiment, the speaker device 16 may be included, for example, in a telephone, such as a landline telephone or a wireless telephone. According to such an embodiment, the speaker device 16 may be in communication with the apparatus 10 via a communications network including, individually or in combination, a wireline network or a wireless network. The communications network may include, for example, individually or in combination, a plain old telephone system (POTS), a public switched telephone network (PSTN), a wireless telephone network, the Internet, an intranet, a LAN, or a WAN, using, for example, packet-switching or circuit-switching transmission modes. According to another embodiment, the speaker device 16 may be hard-wired to the TTS module 14 and/or may be physically included with the apparatus 10.

According to one embodiment, the phonetic screening module 12 includes a table of character strings and corresponding replacement strings. When the apparatus 10 receives a character string, the phonetic screening module 12 compares the received character string with the entries in the table. If the received character string is not included in the table, the character string is forwarded to the TTS module 14 for enunciation. Conversely, if the received character string is included in the table, the phonetic screening module 12 forwards the corresponding substitute character string for the received character string to the TTS module 14 for enunciation.

The apparatus 10 may receive the character strings, for example, from a database in communication with the apparatus 10. For example, as described further hereinbelow, the database may be a telecommunications network database in communication with the apparatus 10. According to another embodiment, the character strings may be received from another application running on the apparatus 10 such as, for example, an electronic mail (e-mail) or a word processing application, where the text of an e-mail document or a word processing document is to be voiced over the speaker device 16.

The TTS module 14 may include text-to-speech translation capabilities to convert text, such as the character strings received from the phonetic screening module 12, into voice output using speech synthesis techniques. The speech synthesis conversion techniques may convert text to speech in real time and without a predefined vocabulary. The speech output may be communicated to the speaker device 16 for audible enunciation. According to one embodiment, the TTS module 14 may be implemented with commercially-available software/DSP boards from, for example, Dialogic Corporation, Parsippany, N.J., or Lucent Technologies, Inc., Murray Hill, N.J.

The apparatus 10 of the present invention permits phonetically inappropriate character strings to be replaced with more appropriate substitute character strings before being audibly enunciated to a listener. Such a capability may be beneficial in an application where the character string received by the apparatus 10 is a truncated form of a longer character string, and the truncated character string is inappropriate when enunciated. For example, the truncated character string may be an expletive or a phonetic variation of the expletive. In addition, the truncated character string, although not an expletive, may be unflattering to the listener or a third party. The phonetic screening module 12 of the present invention permits these inappropriate character strings to be replaced with a more appropriate character string. The more appropriate character string may include, for example, no characters, one character, or a plurality of characters.

Figure 2:
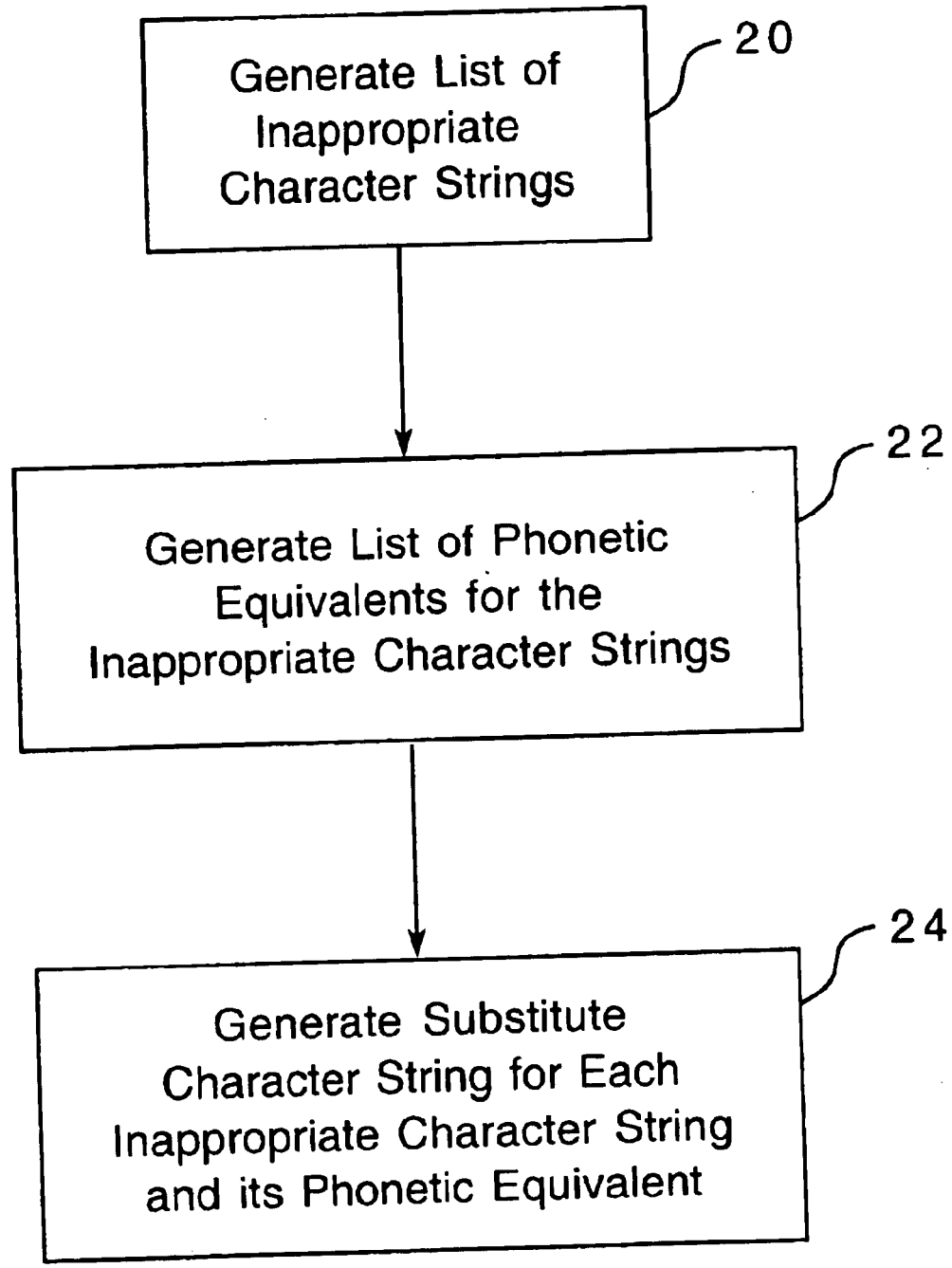
FIG. 2 is a block diagram of the process of generating substitute character strings for phonetically screened character strings according to one embodiment of the present invention.

One embodiment of the process of generating the table of the phonetic screening module 12 is described in conjunction with the flow chart diagram of FIG. 2. The process initiates at block 20, where a list of inappropriate character strings is generated. As discussed hereinbefore, the inappropriate character strings may be, for example, expletives or unflattering words. The list may be generated in part based on the application in which the apparatus 10 is intended to be used. For example, certain character strings may be inappropriate in some applications but acceptable for others. In addition, the list may be generated in part based on the parameters of the TTS module 14. For example, where a particular character string is susceptible to two possible pronunciations, one of which is inappropriate, the character string may be included in the list if, according to the manner in which the TTS module 14 is programmed, the TTS module 14 would output the inappropriate pronunciation.

From block 20, the process advances to block 22, where phonetic equivalents of the inappropriate character strings are generated. For example, if at block 22 it is determined that "cat" is an inappropriate character string, the inappropriate phonetic equivalents may be, for example, "catt", "kat", and "katt".

From block 22, the process advances to block 24, where a substitute character string is generated for each inappropriate character string and its phonetic equivalents. According to one embodiment, the inappropriate character string may have a separate substitute character string than certain of its phonetic equivalents. According to another embodiment, the inappropriate character string may have the same substitute character string as its phonetic equivalents. The substitute character strings may consist of, for example, zero characters, one character, or a number of characters.

Accordingly, whenever the apparatus 10 receives a character string, the phonetic screening module 12 compares the received character string with the listing of inappropriate character strings and their phonetic equivalents. If there is a match, the phonetic screening module 12 replaces the received character string with the substitute character string associated with the inappropriate character string. The substitute character string may then be forwarded to the TTS module 14 for enunciation.

Figure 3:
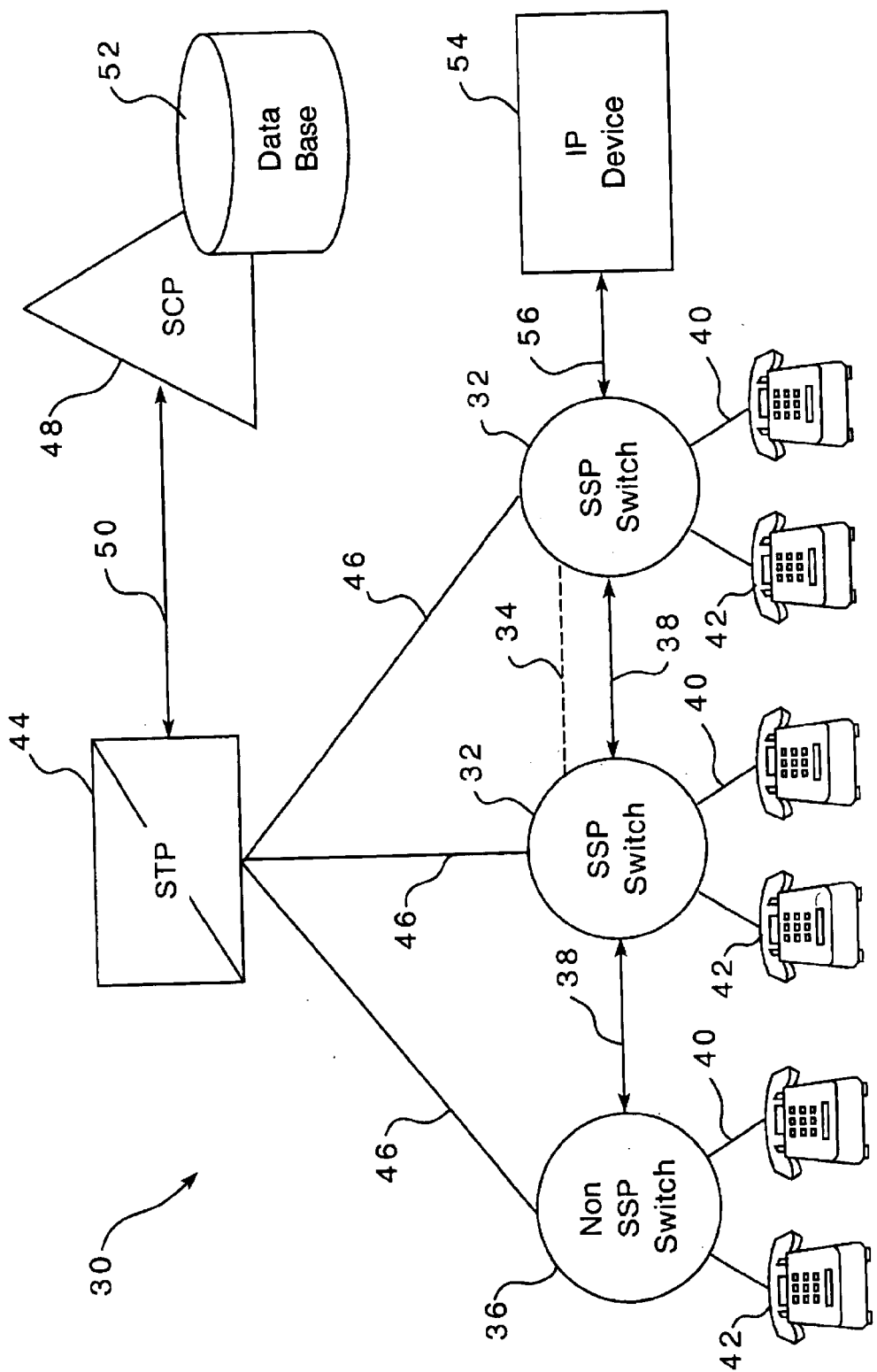
FIG. 3 is a block diagram of an Advanced Intelligent Network (AIN) for integration with a public switched telephone network.

As discussed hereinbefore, the apparatus 10 of the present invention may be used in providing telecommunications service. FIG. 3 is diagram of a telecommunications network according to such an embodiment. FIG. 3 is a block diagram of an Advanced Intelligent Network (AIN) 30 for integration with a public switched telephone network (PSTN). The AIN 30 may be employed by a Local Exchange Carrier (LEC) servicing a Local Access and Transport Area (LATA) of the PSTN, and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 30 as illustrated in FIG. 3, the central office switches may be provided as Service Switching Points (SSP) switches 32. The dashed line 34 between the SSP switches 32 indicates that the number of SSP switches 32 in the AIN 30 may vary depending on the particular requirements of the AIN 30. The AIN 30 may also include a non-SSP switch 36. The difference between the SSP switches 32 and the non-SSP switch 36 is that the SSP switches 32 provide intelligent network functionality. Interconnecting the SSP switches 32 and the non-SSP switch 36 are communication links 38, which may be, for example, trunk circuits.

Each SSP switch 32 and non-SSP switch 36 has a number of subscriber lines 40 connected thereto. The subscriber lines 40 may be, for example, conventional twisted pair loop circuits connected between the switches 32, 36 and the telephone drops for the customer premises, or the subscriber lines 40 may be trunk circuits, such as T-1 trunk circuits. Typically, the number of subscriber lines 40 connected to each switch 32, 36 is on the order of ten thousand to one hundred thousand lines. Each of the subscriber lines 40 is connected to a terminating piece of customer premises equipment, represented in FIG. 3 by the landline telephones 42. Alternatively, the terminating equipment may be, for example, a telecopier, a personal computer, a modem, or a private branch exchange (PBX) switching system.

For the AIN 30 illustrated in FIG. 3, each SSP switch 32 and the non-SSP switch 36 is connected to a signal transfer point (STP) 44 via a communication link 46. The communication link 46 may employ, for example, an SS7 switching protocol. The STP 44 may be a multi-port high speed packet switch that is programmed to respond to the routing information in the appropriate layer of the switching protocol, and route the data packets to their intended destination.

One of the intended destinations of the data packets from the STP 44 is a service control point (SCP) 48. The STP 44 is in communication with the SCP 48 via a communication link 50, which may also employ the SS7 switching protocol. The SCP 48 may be an intelligent database server such as, for example, an Intelligent Network Service Control Point available from Lucent Technologies Inc., Murray Hill, N.J. The SCP 48 may have associated with it a network database 52 for storing network data. The intelligent functionality of the SCP 48 may be realized by application programs, such as Service Program Applications (SPAs), which are run by the SCP 48. The SCP 48 is normally employed to implement high volume routing services, such as call forwarding and 800 number translation and routing. The SCP 48 may also be used for maintenance of and providing access to the network databases for authorization of billing, such as credit card validations. In addition, another of the functions of the SCP 48 is maintenance of the network database 52, which may store subscriber information, such as customer names, used in providing enhanced calling services. Such enhanced calling services may include talking call waiting (TCW), audio calling name (ACN), and audio call return (e.g. *69).

The AIN 30 illustrated in FIG. 3 also includes an intelligent peripheral (IP) device 54. The IP device 54 may be, for example, a service node such as a Compact Service Node (CSN) available from Lucent Technologies Inc., Murray Hill, N.J., although the IP device 54 may be any other AIN-compliant IP device such as, for example, an AIN/IP (Intelligent Peripheral) device available from Nortel Networks Corp., Montreal, Quebec. The IP device 54 may be connected to one or more of the SSP switches 32 via a communications link 56, which may be, for example, an Integrated Service Digital Network (ISDN) including BRI (Basic Rate Interface) or PRI (Primary Rate Interface) lines. According to other embodiments, the communications link 56 may be, for example, a T-1 trunk circuit.

The IP device 54 may be used primarily when some enhanced feature or service is needed that requires an audio connection to the call such as, for example, the call return and calling name services, or when transfer of a significant amount of data to a subscriber over a switched connection during or following a call is required. Similar to the SCP 48, the intelligent functionality of the IP device 54 may be realized by program applications executable by the IP device 54. For example, for applications in which information is to be enunciated to a user of the telephone 42, the IP device 54 may include the apparatus 10 of the present invention, as described further hereinbelow.

In order to keep the processing of data and calls as simple as possible at the switches, such as at the SSP switches 32, a set of triggers maybe defined at the SSP switches 32 for each call. A trigger in an AIN is an event associated with a particular subscriber line 40 that generates a data packet to be sent from the SSP switch 32 servicing the particular subscriber line 40 to the SCP 48 via the STP 44. The triggers may be originating triggers for calls originating from the subscriber premises or terminating triggers for calls terminating at the subscriber premises. A trigger causes a message in the form of a query to be sent from the SSP switch 32 to the SCP 48. The SCP 48 in turn interrogates the database 52 to determine whether some customized call feature or enhanced service should be implemented for the particular call, or whether conventional dial-up telephone service should be provided. The results of the database inquiry are sent back from th& SCP 48 to the SSP switch 32 via the STP 44. The return packet includes instructions to the SSP switch 32 as to how to process the call. The instructions may be to take some special action as result of a customized calling service or enhanced feature. For example, for an enhanced calling feature requiring the capabilities of the IP device 54, the return message from the SCP 48 may include instructions for the SSP switch 32 to route the call to the IP device 54. In addition, the return message from the SCP 48 may simply be an indication that there is no entry in the database 52 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN 30.

The AIN 30 illustrated in FIG. 3 includes only one STP 44, one SCP 48, one network database 52, and one IP device 54, although the AIN 30 may further include an additional number of these components as well as other network components which not are included in FIG. 3 for purposes of clarity. For example, the AIN 30 may additionally include redundant STPs and STPs to take over if the STP 44 or the SCP 48 should fail. In addition, the AIN 30 may include an Automatic Electronic Switching System (AESS) Network Access Point (NAP) in communication with the STP 44, which may be programmed to detect the trigger conditions. Further, the AIN 30 may include regional STPs and regional SCPs in communication with, for example, the local STP 44, for routing and servicing calls between different LECs.

Figure 4:
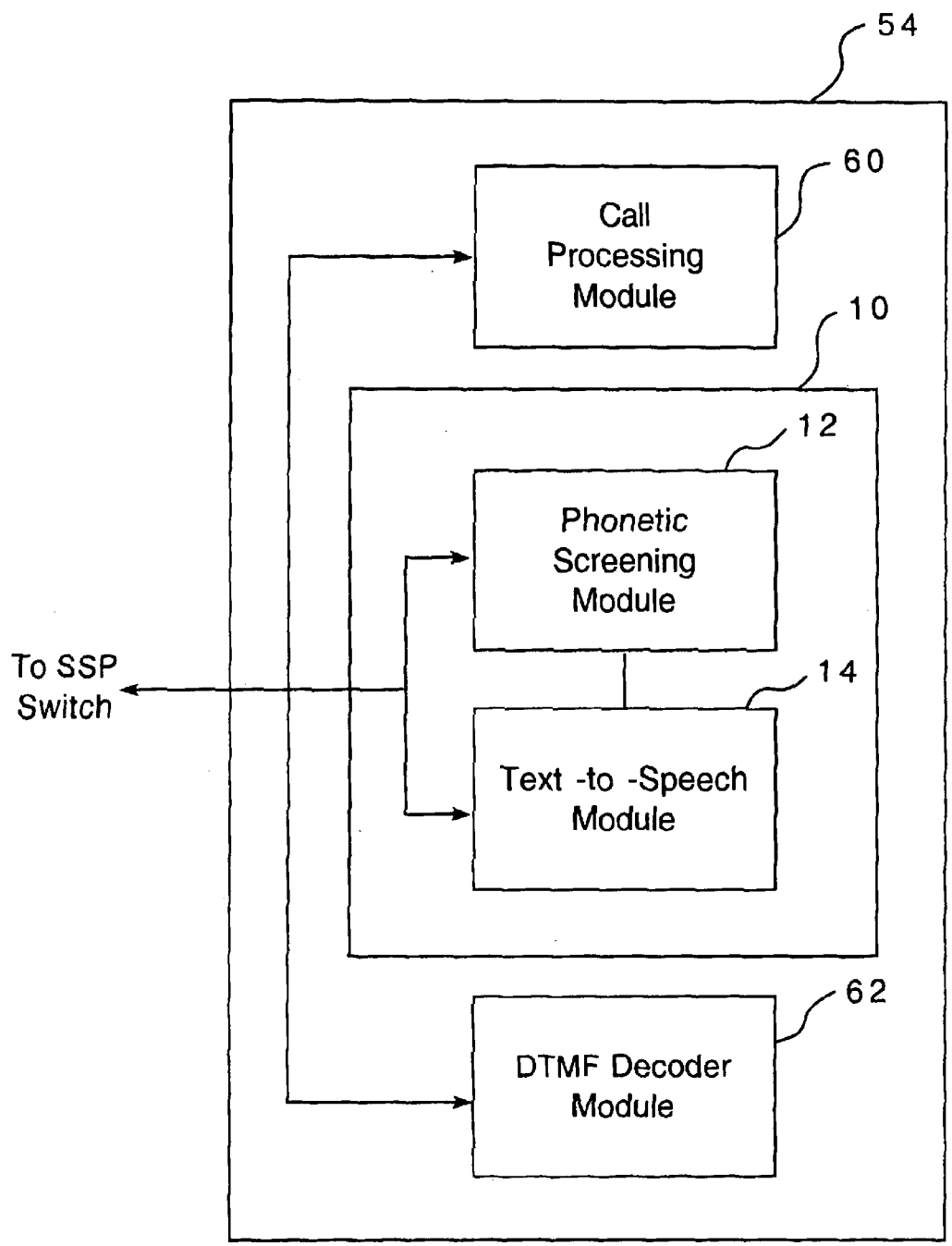
FIG. 4 is a block diagram of the intelligent peripheral (IP) device of the AIN of FIG. 3 according to one embodiment of the present invention.

FIG. 4 is a block diagram of the IP device 54 according to one embodiment of the present invention. The IP device 54 includes the apparatus 10 described hereinbefore for phonetically screening predetermined character strings. In addition, the IP device 54 may include a call processing module 60 for receiving call processing commands and performing conventional call processing logic. The IP device 54 may also include a DTMF decoder module 62 for recognizing the dialing of Dual Tone MultiFrequency (DTMF) characters from, for example, a touch-tone telephone in communication with the IP device 54 via the AIN 30. The modules 12, 14, 60, 62 permit the IP device 54 to mediate interaction between the caller and the applications executed by the IP device 54 in providing enhanced calling features for a customer, as described hereinbelow.

The modules 12, 14, 60, 62 may be implemented as software code to be executed by the IP device 54 using any type of computer instruction type suitable such as, for example, microcode, and can be stored in, for example, an electrically erasable programmable read only memory (EEPROM), or can be configured into the logic of the IP device 54. According to another embodiment, the modules 12, 14, 60, 62 may be implemented as software code to be executed by the IP device 54 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

Figure 5:
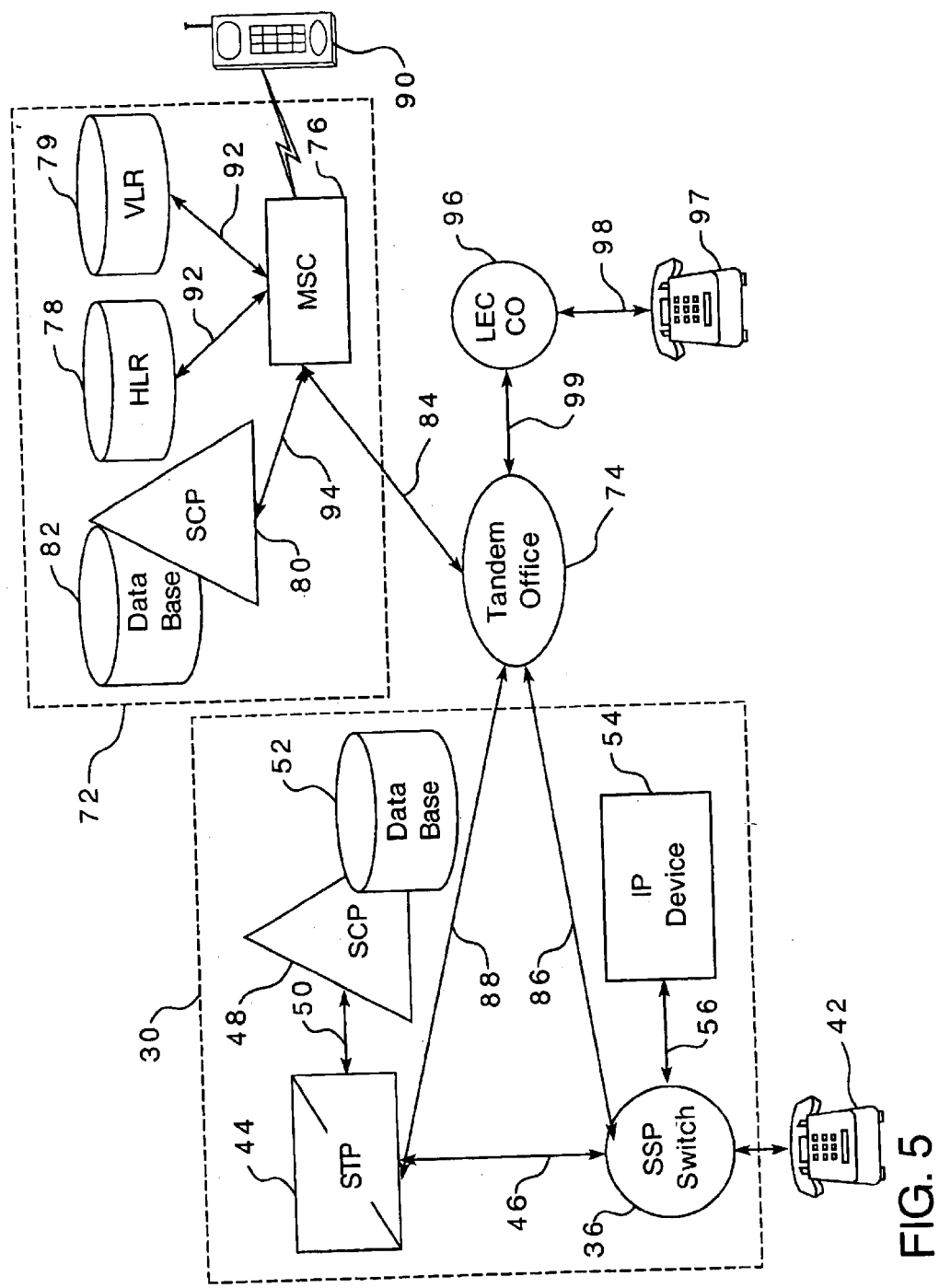
FIG. 5 is a block diagram of the communications network according to one embodiment of the present invention.

FIG. 5 is a block diagram of a network 70 according to one embodiment of the present invention. The network 70 includes the AIN 30 illustrated in FIG. 3, including the SSP switch 32, the STP 44, the SCP 48, and the IP device 54. For clarity, only one SSP switch 32, one STP 44, one SCP 48, and one IP device 54 are shown in FIG. 5 although, as discussed hereinbefore, the AIN 30 may include a multiple number of these components.

The network 70 also includes a wireless network 72 in communication with the AIN 30 via a tandem office 74. The wireless network 72 includes a Mobile Switching Center (MSC) 76, a Home Location Register (HLR) 78, a Visitor Location Register (VLR) 79, and a Service Control Point (SCP) 80 with an associated database 82. The MSC 76, HLR 78, VLR 79 and SCP 80 of the wireless network 72 may provide an intelligent wireless network capable of providing enhanced calling'services and features for wireless subscribers, and which is the wireless complement to the landline-based AIN 30. According to one embodiment, the intelligent wireless network 72 may be a Wireless Intelligent Network (WIN), such as used in TDMA-based wireless networks, or a CAMEL network, such as used in CDMA-based wireless networks.

The tandem office 74 provides a switching interface between the PSTN and the wireless network 72. The tandem office 74 is in communication with the MSC 76 of the wireless network 72 via a communications link 84 employing, for example, an IS-41 signaling protocol. The tandem office 74 may be in communication with the SSP switch 32 of the AIN 30 via a communications link 86, such as a trunk circuit. The tandem office 74 may also be in communication with the STP 44 of the AIN 30 via a communications link 88 employing, for example, an SS7 signaling protocol.

The MSC 76 is in communication with wireless telecommunications devices, such as the wireless telephone 90 via, for example, a base transceiver station (BTS) (not shown). The BTS may communicate with wireless telecommunications devices, such as the wireless telephone 90, according to an air-interface communication scheme such as , for example, AMPS (ANSI-553), TDMA (IS-136), CDMA (IS-95), or GSM. The BTS may be in communication with the MSC 76 via, for example, an ISDN or SS7 communications link. The MSC 76 is an automatic switching system in a wireless telecommunications network that acts as the interface for subscriber traffic between the wireless network 72 and the PSTN or other MSCs in the same or other wireless networks. The MSC 76 performs the same general function as a central office switch in a landline based system, except that the MSC 76 provides for incoming calls through a radio telecommunications front-end. Accordingly, the MSC 76 may include SSP switches (not shown) for detecting, for example, originating and terminating triggers.

The MSC 76 is in communication with the HLR 78 and the VLR 79 via communications links 92 which may, for example, be SS7 signaling protocol links. The HLR 78 and VLR 79 are location registers to which the user identity of a wireless telecommunications device, such as the wireless telephone 90, is assigned for record purposes. If the wireless telephone 90 is within its home location, the HLR 78 is assigned for record purposes. Conversely, if the wireless telephone 90 is in a visitor location, the VLR 79 is assigned for record purposes. The HLR 78 and VLR 79 may register subscriber information relating to the wireless telecommunications devices such as, for example, profile information, current location, and authorization period. When the MSC 76 detects a wireless telecommunications device entering the MSC's service area, the MSC 76 performs a registration process that includes requesting subscriber profile information from either the HLR 78 or the VLR 79 depending upon, as discussed hereinbefore, whether the wireless telephone 90 is within its home location or within a visitor location. The HLR 78 and VLR 79 may, or may not, be located within and be indistinguishable from the MSC 76, and may be distributed over more than one physical entity. In addition, one HLR 78 and one VLR 79 may serve more than one MSC 76.

The SCP 80 of the wireless network 72 is similar to the SCP 48 of the AIN 30, and contains the logic, which in conjunction with the network data stored in the associated database 82, is used to provide the enhanced calling services and features for wireless subscribers. The SCP 80 is in communication with the MSC 76 via a communications link 94, which may be, for example, an SS7 signaling protocol link. The SCP 80 receives query messages from the MSC 76, which may be routed through the MSC 76 from other network elements, and responds to the query, as described hereinbefore with respect to the SCP 48 of the AIN 30, in a manner appropriate to the query in the context of the enhanced calling service or feature. For example, the SCP 80 may return a message to the MSC 76 to route a communication to the IP device 54 via the tandem office 74 and the SSP switch 32.

The tandem office 74 may also provide a switching interface between the AIN 30 and another LEC central office (CO) 96. The LEC CO 96 may be a central office switch for the same LEC as the AIN 30, or the LEC CO 96 may be a central office switch for another LEC. The LEC CO 96 may include an SSP switch, and may be in communication with a landline telephone 97 via a subscriber line 98. The LEC CO 96 may be in communication with the tandem office 74 via a communications link 99, which may be, for example, a trunk circuit.

The communications network 70 of the present invention may be utilized to provide enhanced calling features and services with phonetic screening capabilities, as described hereinbelow. Although the telephones 42, 90, and 97 are illustrated as the pieces of terminating equipment, those skilled in the art will understand that such pieces may also include other telecommunication units or devices such as, for example, facsimile machines, computers, and modems. The term "calling party" is used herein generally to refer to the person or device that initiates a communication. The calling party may also be referred to herein as "caller." In some cases, the calling party may not be a person, but may be a device such as a telecommunications device including a facsimile machine, answering service, modem, etc. The term "called party" is used herein generally to refer to the person or device that answers or responds to the call or communication. The term "subscriber" is used herein to generally refer to a subscriber of the one of the described calling features or services. The called party need not necessarily be the subscriber of a service, nor the party whom the caller is trying to reach. The term "communication" is used herein to include all messages or calls that may be exchanged between a calling party and a called party in the network 70 illustrated in FIG. 6, including voice, data and video messages. The term "communication" is used synonymously herein with the term "call" unless a distinction is noted.

Figure 6:
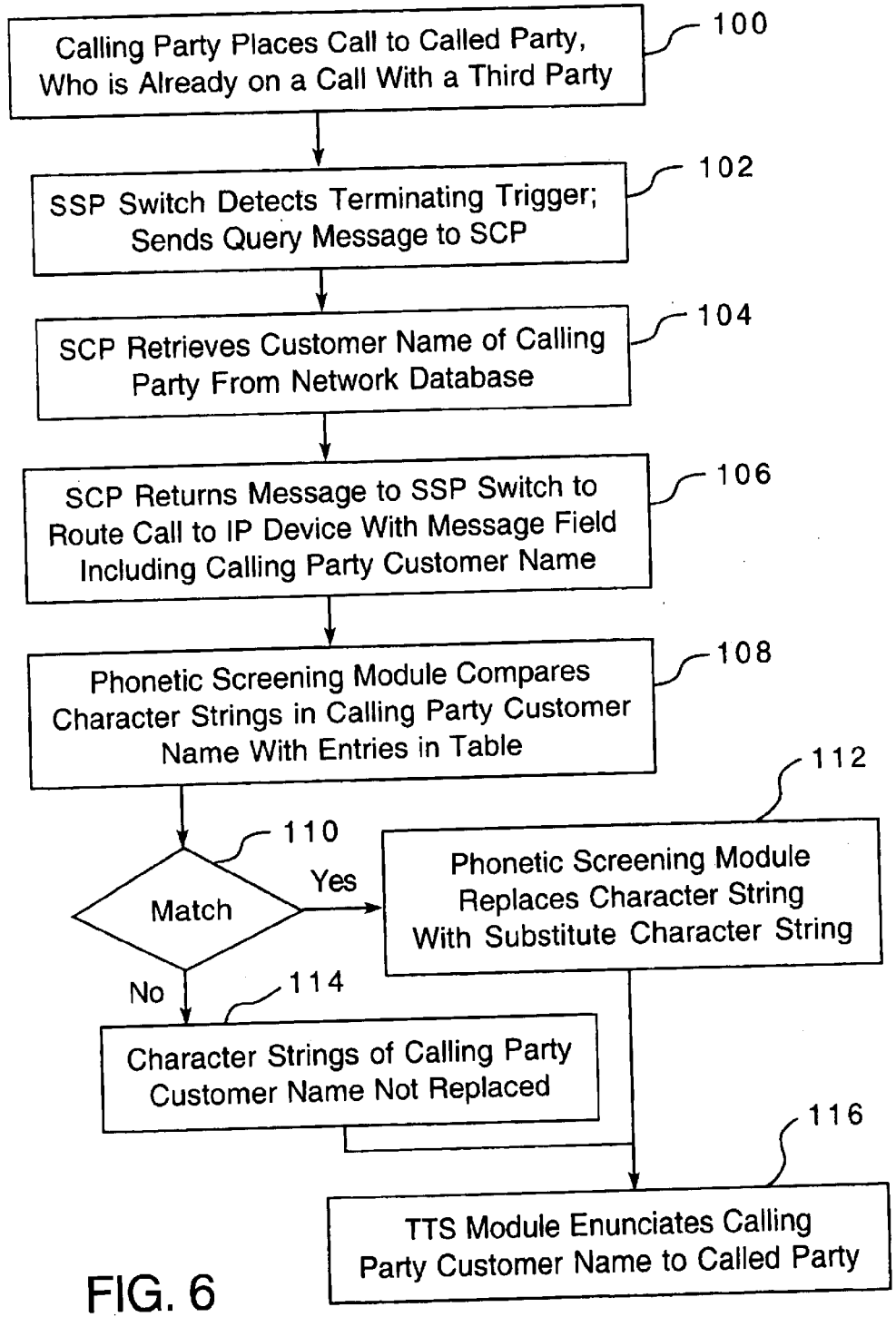
FIG. 6 is a block diagram illustrating a method of providing a talking call waiting (TCW) service with phonetic screening with the network of FIG. 5 according to one embodiment of the present invention.

FIG. 6 is a block diagram illustrating an embodiment of how the network 70 may be utilized to provide the talking call waiting (TCW) service with phonetic screening capabilities. The process starts at block 100, with a calling party placing a call to a called party who is already on a call with a third party. With reference to FIG. 5, for the purposes of the illustrated embodiment, the calling party is a user of the wireless telephone 90 or the landline telephone 97, and the called party is a user of the landline telephone 42, although according to other embodiments, as described hereinbelow, the called party may be a user of the wireless telephone 90. Calls from either the wireless telephone 90 or the landline telephone 97 are routed to the SSP switch 32 of the AIN 30 via the tandem office 74 according to conventional call processing. A terminating trigger at the SSP switch 32 specific to the TCW service is detected, causing the SSP switch 32 to send a query message to the SCP 48 at block 102. The query message may be, for example, a terminating attempt trigger (TAT) query message.

At block 104, in response to the query message from the SSP switch 32, the SCP 48 may interrogate the network database 52 to retrieve the customer name of the calling party. As discussed hereinbefore, the customer name retrieved from the network database 52 may include truncated character strings of the full customer name which, in their abbreviated form, may be inappropriate for enunciation to the called party.

From block 104 the process advances to block 106, where the SCP 48 returns a message to the SSP switch 32 to route the call to the IP device 54 with a message field including the customer name of the calling party retrieved from the database. At block 108, the phonetic screening module 12 of the IP device 54 compares each of the character strings in the customer name of the calling party with entries in its table of phonetically inappropriate character strings. If there is a positive match a block 110, the process advances to block 112, where the phonetic screening module 10 replaces the detected phonetically inappropriate character strings with its corresponding substitute replacement string. Conversely, if no matches are detected at block 110, the process advances to block 114, where none of the character strings in the calling party customer name is replaced.

From each of blocks 112 and 114 the process advances to block 116, where the call processing module 60 places an outgoing call to the called party such that the TTS module 14 may enunciate to the called party the character strings in the calling party customer name. The called party may then be played a message using, for example, a recorded voice file, providing the called party with options as to how to route the call from the called party. The called party's response to the message may be detected, for example, by the DTMF decoder module 62. Thereafter, the call processing module 60 may apply conventional call processing logic in accordance with the called party's response.

According to other embodiments, the called party may be a user of the wireless telephone 90 and the calling party may be a user of the telephone 42 or the telephone 97. According to such an embodiment, the serving MSC 76 may detect a terminating trigger specific to the calling name service, causing the serving MSC 76 to send a query message to the SCP 80 at block 102. As discussed hereinbefore with respect to FIG. 6, the SCP 80 may then route the call to the IP device 54 to provide the TCW service with phonetic screening capabilities according to the present invention.

According to another embodiment, the network 70 of FIG. 5 may be utilized to provide, for example, the audio calling name (ACN) service with phonetic screening capabilities. The method by which the network 70 may be used to implement the ACN service is similar to the TCW service described hereinbefore with respect to FIG. 6, except that the called party need not be on a call with a third party at the time the calling party initiates the call. In addition, after enunciating to the called party the character strings in the customer of the calling party, the IP device 54 may play a Message, for example, prompting the called party to either (i) accept the incoming call, (ii) reject the incoming call, or (iii) route the incoming call to a voice messaging system associated with the called party. The prompting message may be stored on the IP device 54 as a recorded voice file. The DTMF decoder module 62 may then detect the called party's response to the prompting message. Thereafter, the call processing module 60 may route the call in accordance with the called party's response. Similarly, according to other embodiments of the ACN service, the called party may be a user of the wireless telephone 90 and the calling party may be a user of the telephone 42 or the telephone 97.

Figure 7:
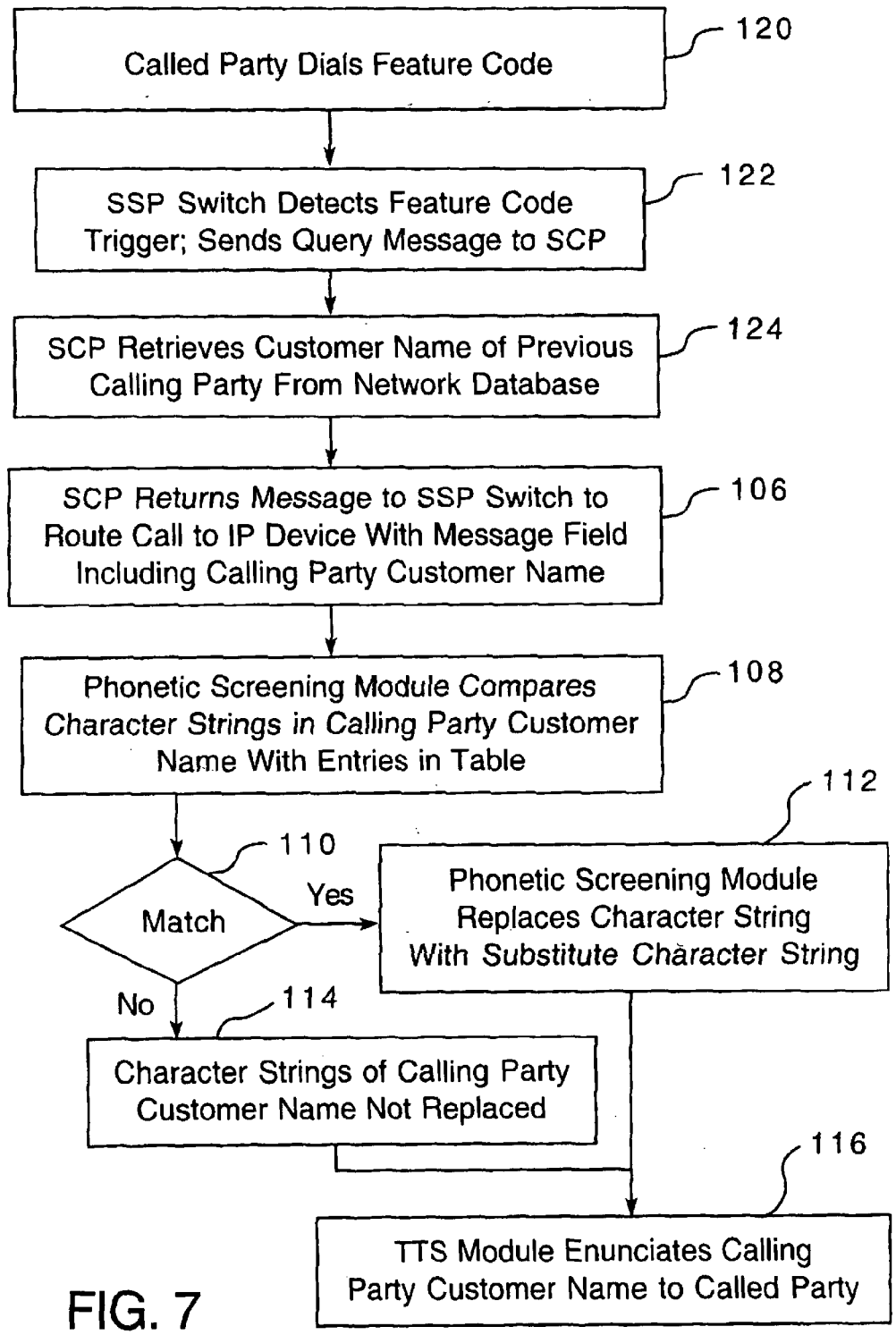
FIG. 7 is a block diagram illustrating a method of providing an audio call return (ACR) service with phonetic screening with the network of FIG. 5 according to one embodiment of the present invention.

FIG. 7 is a block diagram of a method according to one embodiment for using the network 70 of the present invention for providing the audio call return (ACR) feature with phonetic screening functionality. The service will be described with reference to the network 70 illustrated in FIG. 5 wherein the called party is a user of the telephone 42, although, according to other embodiments as described hereinbelow, the called party may be a user of the wireless telephone 90. The process begins at block 120, with the called party (i.e., a user of the telephone 42), dialing a feature code specific to the automatic recall service, such as "*69", to learn, for example, the name and telephone number of an immediately previous calling party. Prior to the called party dialing the feature code for the automatic recall service, therefore, it is assumed that a calling party, such as from the wireless telephone 90 or the landline telephone 97, placed a communication to the called party, which was routed according to conventional call processing logic to the SSP switch 32 servicing the called party, which stored automatic-recall related information such as, for example, a directory number of the calling party and a time stamp, in a line history block of the SSP switch 32. By dialing the feature code for the automatic recall service at block 120, the called party may seek to access the name and/or telephone number of the immediately previous calling party.

From block 120, the process continues to block 122, where an originating feature code trigger for the automatic recall service is detected by the SSP switch 32 servicing the telephone 42. After detection of the trigger, at block 124, the recall-related information stored in the line history block of the SSP switch 32 is embedded in a message, such as in a field of a TCAP message, and sent to the SCP 48. As described hereinbefore, the automatic recall-related information may include, for example, the directory number for the last incoming calling party and a time stamp of the communication. From block 124, the process continues to block 126 where the SCP 48 interrogates the network database to ascertain the customer name associated with the directory number of the last incoming calling party.

Thereafter, the process may progress in a fashion similar to that described hereinbefore for TCW service described in conjunction with FIG. 6. From block 124 the process advances to block 106, where the SCP 48 returns a message to the SSP switch 32 to route the call to the IP device 54 with a message field including the customer name of the calling party retrieved from the database. At block 108, the phonetic screening module 12 of the IP device 54 compares each of the character strings in the customer name of the calling party with entries in its table of phonetically inappropriate character strings. If there is a positive match at block 110, the process advances to block 112, where the phonetic screening module 10 replaces the detected phonetically inappropriate character string with its corresponding substitute replacement string. Conversely, if no matches are detected at block 110, the process advances to block 114, where none of the character strings in the calling party customer name are replaced.

From each of blocks 112 and 114 the process advances to block 116, where the call processing module 60 places an outgoing call to the called party such that the TTS module 14 may enunciate to the called party the character strings in the calling party customer name. The called party may then be played a message using, for example, a recorded voice file, providing the called party with options as to how to route the call from the called party. The called party's response to the message may be detected, for example, by the DTMF decoder module 62. Thereafter, the call processing module 60 may apply conventional call processing logic in accordance with the called party's response.

According to other embodiments of the ACR service, as described hereinbefore with respect to the TCW service, the called party may be a user of the wireless telephone 90 and the calling party may be a user of the telephone 42 or the telephone 97.

Figure 8:
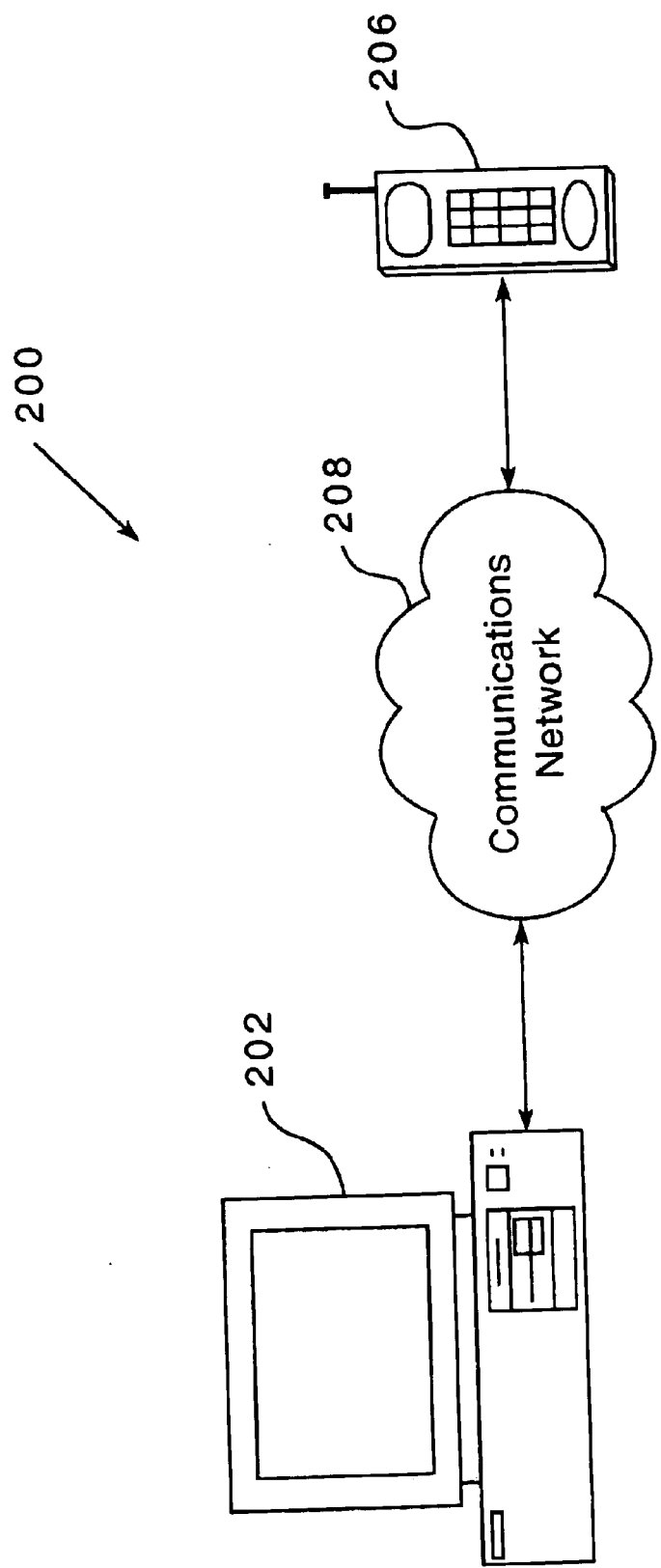
FIG. 8 is a diagram of a network according to another embodiment of the present invention.

FIG. 8 is a diagram of a network 200 according to another embodiment of the present invention. The network 200 includes a computing device 202 in communication with a telecommunications device 206 via a communications network 208. The computing device 200 may be, for example, a personal computer, as illustrated in FIG. 8, a laptop computer, or a workstation. In addition, the computing device 202 may include the phonetic screening apparatus 10 described hereinbefore with respect to FIG. 1. The TTS module 14 of the apparatus 10 may be in communication with a speaker device 16 in the telecommunications device 206 via the communications network 208. The telecommunications device 206 may be, for example, a wireless telephone, as illustrated in FIG. 8, a landline telephone, or any other telecommunications device including a speaker. The communications network 208 may include, individually or in combination, a wireline network or a wireless network. According to one embodiment, the communications network 208 may include, individually or in combination, a plain old telephone system (POTS), a public switched telephone network (PSTN), a wireless telephone network, the Internet, an intranet, a LAN, or a WAN, using, for example, packet-switching or circuit-switching transmission modes.

According to such an embodiment, in an application where, for example, character strings from a text-based application running on the computing device 202 are voiced to a user of the telecommunications device 206, the apparatus 10, which as discussed hereinbefore may be included as a component of the computing device 202, may phonetically screen inappropriate character strings voice to the user of the telecommunications device. For example, if the computing device 202 includes an application which permits the voicing of e-mail messages to a user of the telecommunications device 206, the phonetic screening module 12 of the apparatus 10 may phonetically screen inappropriate character strings in the e-mail message.

Although the present invention has been described herein with respect to certain embodiments, those of ordinary skill in the art will recognize that many modifications and variations of the present invention may be implemented. The foregoing description and the following claims are intended to cover all such modifications and variations.

What is claimed is:

1. An apparatus for phonetically screening predetermined character strings, comprising:

a text-to-speech module; and a phonetic screening module in communication with the text-to-speech module, wherein the phonetic screening module is for replacing a first character string with a second character string based on an inappropriate phonetic enunciation associated with the first character string, the second character string having a phonetic enunciation dissimilar to the inappropriate phonetic enunciation associated with the first character string.

2. The apparatus of claim 1, wherein the phonetic screening module is further for comparing the first character string with a plurality of predetermined character strings having a corresponding plurality of inappropriate phonetic enunciations associated therewith, and for replacing the first character string with the second character string when the first character string matches one of the plurality of predetermined character strings.

3. The apparatus of claim 2, wherein the second character string has a length selected from the group consisting of zero characters, one character, and a plurality of characters.

4. The apparatus of claim 2, wherein the text-to-speech module is for converting the second character to speech output.

5. A network for providing a telecommunications service with phonetic screening to a telecommunications user, comprising:
a switch in communication with a telecommunications device associated with the telecommunications user for detecting a trigger specific to the telecommunications service in response to a communication from one of the telecommunications user and a calling party; and
an intelligent peripheral device in communication with the switch for:
receiving from the switch a message including a character string identifying the calling party;
replacing the character string with a substitute character string when the character string matches one of a set of phonetically predetermined character strings having a corresponding set of inappropriate phonetic enunciations associated therewith, wherein the substitute character string has a phonetic enunciation dissimilar to the one of the set of phonetically predetermined character strings; and
converting the substitute character string to speech output for transmission to the telecommunications user via the switch.

6. The network of claim 5, wherein the telecommunications service is selected from the group consisting of a talking call waiting telecommunications service, an audio calling name telecommunications service, and an audio call return telecommunications service.

7. The network of claim 5, wherein the switch includes an SSP switch of a central office in communication with the telecommunications device via a subscriber line.

8. The network of claim 5, wherein the switch includes a switch of a mobile switching center in communication with the telecommunications device via an air-interface communication scheme.

9. The network of claim 5, further comprising a service control point in communication with the switch.

10. The network of claim 9, wherein:
the switch is further for sending a query message to the service control point in response to detecting the trigger; and
the service control point is for returning a message to the switch including the character string identifying the calling party.

11. A network for providing a telecommunications service with phonetic screening to a telecommunications user, comprising:

a switch in communication with a telecommunications device associated with the telecommunications user for detecting a trigger specific to the telecommunications service in response to a communication from one of the telecommunications user and a calling party;
a call processing module in communication with the switch for receiving from the switch a message including a character string identifying the calling party;
a phonetic screening module in communication with the call processing module for replacing the character string with a substitute character string when the character string matches one of a set of phonetically predetermined character strings having a corresponding set of inappropriate phonetic enunciations associated therewith, wherein the substitute character string has a phonetic enunciation dissimilar to the one of the set of phonetically predetermined character strings; and
a text-to-speech module for converting the substitute character string to speech output for transmission to the telecommunications user via the switch.

12. The network of claim 11, wherein the telecommunications service is selected from the group consisting of a talking call waiting telecommunications service, an audio calling name telecommunications service, and an audio call return telecommunications service.

13. The network of claim 11, wherein the switch includes an SSP switch of a central office in communication with the telecommunications device via a subscriber line.

14. The network of claim 11, wherein the switch includes a switch of a mobile switching center in communication with the telecommunications device via an air-interface communication scheme.

15. The network of claim 11, further comprising a service control point in communication with the switch.

16. The network of claim 15, wherein:
the switch is further for sending a query message to the service control point in response to detecting the trigger; and
the service control point is for returning a message to the switch including the character string identifying the calling party.

17. The network of claim 11, further comprising a DTMF decoder module in communication with the call processing module.

18. A network for providing a telecommunications service with phonetic screening to a telecommunications user, comprising:
means for detecting a communication from one of the telecommunications user and a calling party;
means for retrieving a first character string associated with the calling party;
means for replacing the first character string with a second character string when the first character string matches one of a set of phonetically predetermined character strings having a corresponding set of inappropriate phonetic enunciations associated therewith, wherein the second character string has a phonetic enunciation dissimilar to one of the plurality of phonetically predetermined character strings; and
means for converting the second character string to speech output for transmission to the telecommunications user.

19. A method for providing a telecommunications service with phonetic screening to a telecommunications user, comprising:
detecting a communication from one of the telecommunications user and a calling party;

replacing a first character string associated with the calling party with a second character string when the first character string matches one of a set of phonetically predetermined character strings having a corresponding set of inappropriate phonetic enunciations associated therewith, wherein the second character string has a phonetic enunciation dissimilar to the one of the set of phonetically predetermined character strings; and converting the second character string to speech output for transmission to the telecommunications user.

20. A method for phonetically screening predetermined character strings, comprising:

receiving a first character string;

comparing the first character string with a set of phonetically predetermined character strings having a corresponding set of inappropriate phonetic enunciations associated therewith; and replacing the first character string with a second character string when the first character string matches one of the set of phonetically predetermined character strings, wherein the second character string has a phonetic enunciation dissimilar to the one of the set of phonetically predetermined character strings.

21. The method of claim 20, further comprising converting the second character string to speech output.

22. A system, comprising:

a text-to-speech module;

a phonetic screening module in communication with the text-to-speech module, wherein the phonetic screening module is for replacing a first character string with a second character string based on an inappropriate phonetic enunciation associated with the first character string, the second character string having a phonetic enunciation dissimilar to the inappropriate phonetic enunciation associated with the first character string; and a speaker device in communication with the text-to-speech module via a network.

23. The system of claim 22, wherein the phonetic screening module is further for comparing the first character string with a plurality of predetermined character strings, and replacing the first character string with the second character string when the first character string matches one of the plurality of predetermined character strings.

* * * * *